Aug. 26, 1924.

J. W. OWENS

OIL GAUGE

Filed Sept. 14, 1923

1,506,324

Inventor
John W. Owens
By Jacobi & Jacobi
Attorneys

Patented Aug. 26, 1924.

1,506,324

UNITED STATES PATENT OFFICE.

JOHN W. OWENS, OF JEFFERSON, IOWA, ASSIGNOR OF ONE-HALF TO CHARLES G. KELLEY, OF JEFFERSON, IOWA.

OIL GAUGE.

Application filed September 14, 1923. Serial No. 662,706.

*To all whom it may concern:*

Be it known that JOHN W. OWENS, a citizen of the United States, residing at Jefferson, in the county of Greene and State of Iowa, has invented certain new and useful Improvements in Oil Gauges, of which the following is a specification.

This invention relates to new and useful improvements in oil gauges and more particularly to a gauge adapted for application to a pipe when filling tanks of automobile trucks and the like.

The primary object of the invention resides in the provision of a device which enables the laborer filling the tank to prevent the overrunning of the same, which causes a great loss of gasoline and also disturbs the appearance of the truck in general.

Still another object of the invention resides in providing a pipe having an elbow therein, the elbow portion of which is provided with a float carried in a tube, whereby the operator may have indicated to him quite readily when the tank has reached its capacity.

A still further object resides in providing a device which is simple and durable in construction, inexpensive to manufacture, and one which is very efficient and useful in operation.

Figure 1:
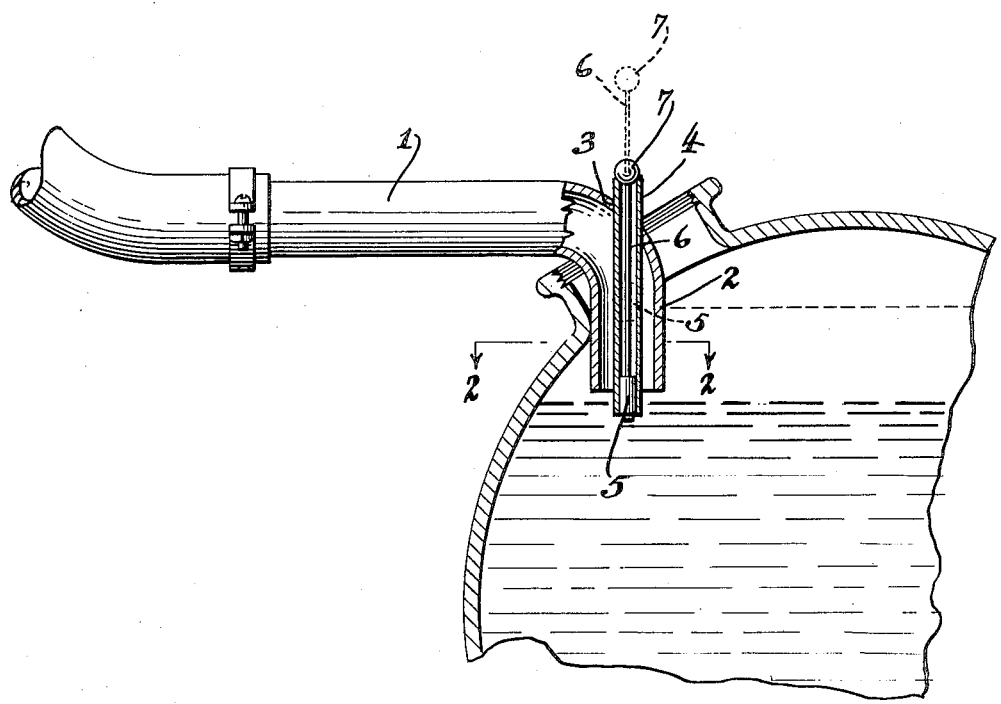
Figure 2:
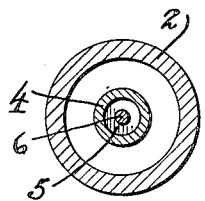

In the accompanying drawings forming a part of this application,

Figure 1 is a side elevation showing my device being applied to use, with parts broken away to show the interior tube and float, and Figure 2 is a transverse section therethrough taken on the line 2—2 of Fig. 1.

Referring to the drawings wherein similar reference characters designate corresponding parts throughout the several views, 1 designates a pipe of any desired size, preferably about three inches in diameter, which may be attached to the end of the filling hose, and one end of the same is bent downwardly to form an elbow designated as 2 in the drawings. This elbow portion is adapted to be disposed in the tank of the truck or other vehicle being filled with gasoline and an opening 3 is provided in the elbow portion for a purpose to be hereinafter more fully described.

A tube or small pipe 4 is provided in the downwardly bent portion 2 of the pipe 1 and extends through the opening 3 above referred to. Any desired means may be provided for holding the tube or pipe 4 in a vertical position within the elbow portion of the pipe 1 and disposed through this tube or pipe 4, is a float designated in the drawing as 5. The float has mounted on its upper face a wire or other form of tank 6, the upper outer end of which is provided with a knob or handle 7 which forms an indicator. This indicator may be colored or provided with any desired indicia to indicate to the party filling the tank when the float has reached a particular level. The tube or pipe 3 extends slightly below the lower end of the elbow portion 2 of the pipe 1.

In applying this device to use, the filling hose is engaged with the outer end of the pipe 1, and the elbow portion 2 of the said pipe 1 is disposed in the tank of the truck or other vehicle being filled. The float 5 is in its lowermost position in the tube or pipe 4 and the gasoline is permitted to flow to the tank. When the gasoline in the tank reaches the proper level, the float 5 will rise on the surface thereof, and the indicator or knob 7 at the top of the wire 6 will indicate to the party filling the tank, that said tank has been filled to its proper level. Thus the loss of gasoline and the annoyance of having the same running over the body of the vehicle is avoided.

It will thus be seen that I have provided a simple, inexpensive and efficient means for accomplishing the object of this invention.

Having thus fully described my invention, what I claim is:—

In a filling device of the class described, a pipe section having one end thereof bent downwardly to provide an elbow, the crown portion of said elbow being provided with an opening disposed on a vertical axis concentric with the dependent portion of said elbow, a tube securely fitted in said opening and having its end projecting respectively above the crown of said elbow and below the lower end of the latter, a float movably mounted in said tube, an elongated stem carried by said float and projecting thereabove, and an enlarged member mounted on the upper end of said stem to form a handle and indicator for said float, said member being adapted to be seated on the upper peripheral edge of said tube when the float is in its lowermost position.

In testimony whereof I affix my signature.

JOHN W. OWENS.